United States Patent Office 3,219,609
Patented Nov. 23, 1965

3,219,609
AQUEOUS DISPERSIONS OF VINYL CHLORIDE-ACRYLIC ESTER COPOLYMERS
Jean Perronin, Chantilly, France, assignor, by mesne assignments, to Etablissements Kuhlmann, Paris, France, a corporation of France
No Drawing. Filed Feb. 24, 1961, Ser. No. 91,337
3 Claims. (Cl. 260—29.6)

The present invention concerns aqueous dispersions of vinyl chloride-acrylic ester copolymers.

The polymerisation or co-polymerisation in emulsion form of elastomeric resins gives rise to suspensions of particles smaller than the micron which obey the general laws for aqueous dispersions. Like the latter, they must be used and applied carefully if their flocculation is to be avoided.

The use of these synthetic latexes present certain difficulties.

Thus, they have a strong tendency to flocculate in the presence of electrolytes, and this flocculation is produced more readily when the cations present are of high valency. The use of these latexes is therefore incompatible with solutions of mineral salts, very hard water and certain mineral pigments. In addition, they associate with difficulty with aminoplast resins which necessitate the use of mineral catalysts and stabilisers.

Further it is only possible to use these latexes in a very limited pH range. The stability of these latexes is often a function of the pH, and the basic or acidic agents used to raise or lower the pH bring about an irreversible flocculation. In consequence, this disadvantage limits certain applications and stands in the way of the incorporation of products requiring a different pH.

Further, the use of these latexes is incompatible with certain categories of surface-active agents. Not only are the latter unable to contain an appreciable percentage of mineral salts which favour the flocculation of the latexes, but these agents may play an unfavourable part through their very constitution. In the painting and coating industry the pigments employed are often ground and dispersed in the presence of a variety of wetting agents, dispersing agents and emulsifying agents, of anionic, non-ionic or cationic type. Any plastic dispersion of anionic type will not tolerate, without flocculation, the presence of cationic wetting agents or the incorporation of another dispersion prepared by means of cationic emulsifying agents. This disadvantage consequently considerably limits the choice of surface-active agents in the applications of synthetic latexes.

Finally, the synthetic latexes are characterised by poor mechanical stability. These latexes are often destined to enter into mixtures which have to be homogenised by violent agitation with turbo-agitators, and on the other hand these mixtures may be wanted to make coatings with a spray-gun. In both these cases the friction of the particles amongst themselves causes a partial flocculation of the dispersion with the production of particularly troublesome agglomerates.

The present invention has as its object the preparation of synthetic latexes which have great stability with respect to electrolytes, variations in pH, surface-active agents and mechanical treatments.

According to the present invention therefore a method of preparing vinyl chloride-acrylic ester co-polymers is provided which comprises co-polymerising the vinyl chloride and acrylic ester in the presence of water and a mixture of surface-active agents consisting essentially of (1) sulphated or sulphonated derivatives and (2) condensates of ethylene oxide with compounds containing reactive hydrogen, the catalyst being a redox system.

The invention also includes the novel anionic dispersions.

The monomer proportions may vary within wide limits as a function, for example, of the mechanical properties which it is desired to give to the co-polymer.

Examples of sulphated or sulphonated surface-active agents, which may be used in admixture with condensates of ethylene oxide with compounds containing reactive hydrogen, which may be mentioned are ammonium or alkali metal salts such as ammonium or sodium lauryl sulphate, sodium alkyl-sulphonates, sodium dialkyl-sulphosuccinates or sodium alkylarylsulphonates. A large proportion of the surface-active mixture, about 3 to 15% with respect to the weight of the monomer employed, is suitably used. It is known that the ethylene oxide condensates flocculate when a rise in temperature occurs. In consequence it was to be expected that, due to the exothermic character of the co-polymerisation, flocculation of the ethylene oxide condensates would be produced with formation of agglomerates of the copolymers. This disadvantage does not occur being prevented by the use of a redox system as catalyst. The oxidising agent in the latter may consist of, for example, a per-salt such as persulphates, perborates, or perchlorates or hydrogen peroxide, and the reducing agent may consist of, for example, sulphites, bisulphites, hydrosulphites or ferrous salts or certain phenols such as resorcinol, pyrogallol, pyrocatechol, hydroquinone, thymol or naphthols, and the sequestering agent may consist of, for example, a pyrophosphate, hexametaphosphate or sodium ethylenediamine-tetra-acetate. The redox system enables the co-polymerisation to be started at relatively low temperatures and prevents the violent reaction which, in view of the large proportions of wetting agents, could be produced and cause too great a rise in temperature and pressure. Temperatures compatible with the use of the ethylene oxide condensates are thus realised. The role of the sequestering agent is to liberate only small quantities of oxidising and reducing agents progressively as the polymerisation reaction starts off.

The co-polymers of vinyl chloride and acrylic esters obtained according to the process of the invention are in the form of anionic dispersions. These dispersions are miscible in all proportions with concentrated aqueous solutions of electrolytes, even of high valency. They are, moreover, stable at all pH values, and they are able to stand the addition of acids or bases in highly concentrated solutions without flocculating. They are compatible with all wetting agents, whether of anionic, non-ionic, and even cationic, type. Finally, they have an excellent mechanical stability; they can, for example, stand half an hour's agitation with a turbo-agitator at 2500 revolutions a minute without flocculation.

The dispersions of the invention may be used in the textile industry, in the leather industry or for the preparation of paints.

The following examples, in which the parts indicated are parts by weight, illustrate the invention without limiting it.

*Example 1*

In order to prepare a 10/90 vinyl chloride/ethyl acrylate co-polymer, 405 parts of ethyl acrylate and 45 parts of monomeric vinyl chloride are charged into an autoclave previously purged of oxygen, in the presence of 25 parts of ammonium lauryl sulphate, 18.5 parts of a condensate of oleyl alcohol with 20 molecules of ethylene oxide, 1.5 parts of potassium persulphate, 0.08 part of potassium pyrophosphate trihydrate, 0.06 part of ferrous sulphate heptahydrate and 505 parts of water. The reaction starts at about 30° C., and the heat given out raises the temperature of the reaction mixture to 90° C. After 8 hours at between 40° C. and 60° C., a latex comprising 46 to 47% of dry extract is taken from the autoclave, with a polymerisation yield of 95 to 100%. The dispersion obtained is compatible in all proportions with a 30% aqueous solution of calcium chloride, 30% solution of aluminum chloride, 30% solution of ferric chloride, 10% solution of caustic soda, 23° Bé. solution of hydrochloric acid, 22° Bé. solution of ammonia and 25% solution of lauryl dimethyl-benzylammonium bromide.

*Example 2*

Under the same conditions, a 20/80 vinyl chloride/ethyl acrylate co-polymer is prepared. 360 parts of ethyl acrylate and 90 parts of monomeric vinyl chloride are charged into an autoclave in the presence of 25 parts of ammonium lauryl sulphate, 18.5 parts of a condensate of oleyl alcohol with 20 molecules of ethylene oxide, 1.5 parts of potassium persulphate, 0.08 part of potassium pyrophosphate trihydrate, 0.06 part of ferrous sulphate heptahydrate and 505 parts of water. The reaction starts at about 30° C., and the heat of reaction raises the temperature of the reaction mixture to 90° C. After 8 hours at between 40° C. and 60° C., a latex comprising 46 to 47% of dry extract is taken from the autoclave. The polymerisation yield is 95 to 100%. This co-polymer has different mechanical properties from that of Example 1. This dispersion is compatible in all proportions with a 30% aqueous solution of calcium chloride, a 25% solution of stearamidomethylpyridinium chloride or a 12.5% solution of potassium ferrocyanide.

*Example 3*

A 30/70 vinyl chloride/ethyl acrylate co-polymer is prepared under the conditions of the process of Example 1, using 315 parts of ethyl acrylate and 135 parts of monomeric vinyl chloride. The mechanical properties of this co-polymer are different from those of the co-polymer of Example 1. The films which may be obtained are so much the less flexible because they contain a higher percentage of vinyl chloride. The dispersion is also compatible in all proportions with a 30% aqueous solution of aluminum chloride, a 22° Bé. solution of ammonia or a 38° Bé. solution of sulphuric acid.

*Example 4*

Under the same conditions as in Example 1, a 40/60 vinyl chloride/ethyl acrylate co-polymer is prepared by charging into an autoclave 270 parts of ethyl acrylate and 180 parts of monomeric vinyl chloride. The film of the new co-polymer obtained by gelling at 20° C. is less tacky than those of the preceding examples. The dispersion is also very stable and compatible in all proportions with, for example, a 10% solution of lauryl dimethyl-benzyl-ammonium bromide, or a 25% solution of stearamidomethyl-pyridinium chloride. In addition, it may be agitated for half an hour with a turbo-agitator rotating at 2500 revolutions per minute without flocculation.

*Example 5*

A 50/50 vinyl chloride/ethyl acrylate co-polymer is prepared under the same conditions as in Example 1 by charging into an autoclave 225 parts of ethyl acrylate and 225 parts of monomeric vinyl chloride. The latex obtained is especially stable and may also be mixed in all proportions with a 30% aqueous solution of ferric chloride or a 23° Bé solution of hydrochloric acid.

*Example 6*

A 60/40 vinyl chloride/ethyl acrylate co-polymer is prepared under the same conditions as in Example 1 by charging into an autoclave 180 parts of ethyl acrylate and 270 parts of monomeric vinyl chloride. The aqueous dispersion of the co-polymer obtained is very stable and is also compatible in all proportions with a 30% aqueous solution of calcium chloride, a 30% solution of aluminum chloride, a 10% lauryl dimethyl-benzyl-ammonium chloride solution or a 38° Bé. sulphuric acid solution. This dispersion produces a film at 20° C. and the film obtained is more inflexible than those of the preceding examples.

*Example 7*

A 70/30 vinyl chloride/ethyl acrylate co-polymer is is prepared under the same conditions as in Example 1 by charging into an autoclave 135 parts of ethyl acrylate and 315 parts of monomeric vinyl chloride. The aqueous dispersion obtained is compatible in all proportions with a 10% aqueous solution of caustic soda or a 22° Bé. solution of ammonia. In addition it forms a film at about 50° C.; it gives a film which is inflexible but not brittle at 20° C.

*Example 8*

An 80/20 vinyl chloride/ethyl acrylate co-polymer is prepared under the same conditions as in Example 1 by charging into an autoclave 90 parts of ethyl acrylate and 360 parts of monomeric vinyl chloride. The latex obtained is compatible in all proportions with a 30% aqueous solution of ferric chloride, a 23° Bé. solution of hydrochloric acid or a 15% solution of sodium sulphate.

*Example 9*

A co-polymer rich in vinyl chloride is prepared under the same conditions as in Example 1 by charging into an autoclave 45 parts of ethyl acrylate and 405 parts of monomeric vinyl chloride. A 90/10 vinyl chloride/ethyl acrylate co-polymer is obtained. The aqueous dispersion is compatible in all proportions with a 30% solution of ferric chloride, a 20% solution of caustic soda, a 23° Bé. solution of hydrochloric acid, a 22° Bé. solution of ammonia or a 15% solution of trisodium phosphate.

I claim:
1. Process for the preparation of aqueous dispersions of vinyl chloride/acrylic ester copolymers which comprises copolymerising the vinyl chloride and acrylic ester free from acid groups in the presence of water and a mixture of surface-active agents consisting of (1) a member selected from the group consisting of ammonium lauryl sulphate, sodium lauryl sulfate, sodium alkyl sulphonates, sodium dialkyl sulpho-succinates and sodium alkylaryl-sulphonates and (2) a condensate of ethylene oxide with a fatty alcohol, the catalyst in the polymerisation being a redox system and the amount of the mixture of surface-active agents being from 3% to 15% based on the weight of the monomers.
2. Process as claimed in claim 1 in which the condensate of ethylene oxide is a condensate of 20 moles of ethylene oxide with 1 mole of oleyl alcohol.
3. Aqueous dispersions of vinyl chloride/acrylic ester polymers made by the process of claim 1.

References Cited by the Examiner

UNITED STATES PATENTS

| | | | |
|---|---|---|---|
| 2,462,422 | 2/1949 | Plambeck | 260—86.3 |
| 2,689,242 | 9/1954 | Lucht | 260—29.6 |
| 2,753,318 | 7/1956 | Maeder | 260—29.6 |
| 2,912,349 | 11/1959 | Videen et al. | 260—29.6 |
| 3,112,282 | 11/1963 | Jones | 260—29.6 |

JOSEPH L. SCHOFER, *Primary Examiner.*

LEON J. BERCOVITZ, *Examiner.*